3,422,112
INDOLYL VINDOLINES
Marvin Gorman and Edmund C. Kornfeld, Indianapolis, Ind., assignors to Eli Lilly and Company, Indianapolis, Ind., a corporation of Indiana
No Drawing. Continuation-in-part of application Ser. No. 376,258, June 18, 1964. This application Jan. 22, 1968, Ser. No. 699,327
U.S. Cl. 260—287
Int. Cl. C07d 27/30; C07d 27/32
4 Claims

ABSTRACT OF THE DISCLOSURE

Dimeric alkaloid-like substances, useful as anti-viral agents, are produced by reacting indoles with vindoline or its relatives.

Cross-reference

This application is a continuation-in-part of our application Ser. No. 376,258 filed June 18, 1964, now abandoned.

Background of the invention

Interest in the indole alkaloids has increased markedly during the last decade because of the marketing of reserpine, the first tranquilizer, and of vinblastine and vincristine, useful anti-leukemic drugs, and further because of the many interesting pharmacologic activities associated with other indole alkaloids such as alstonine, ibogamine, catharanthine, quebrachidine, ajmalicine and other related compounds. Among these activities are the ability to lower blood pressure or blood sugar levels in experimental animals. Pharmacologically active indole alkaloids are disclosed in U.S. Patents 3,205,220, 3,097,137, 3,225,053, 2,823,204, 2,752,351 and 2,817,623 and in a review by Svoboda appearing in Anti-Tumor Effects of Vinca Alkaloids pages 9–28 (Proc. 1st Symposium European Cancer Chemotherapy Group (G.E.C.A.) Paris, June 1965) Excerpta Medica Foundation, which also contains an extensive bibliography. Attention is also called to the publications by Moza et al. working in Prague, including one appearing in Collection Czechoslov. Chem. Commun., 28, 1419 (1963).

Naturally, because of the varied nature of the pharmacological or biological activities of these indole alkaloids, as well as their relatively high potency, there has been considerable interest in synthesizing structurally related compounds possessing the desired activity without concomitant side effects, or simply in attempting to prepare a more readily available compound having the same activity as the known indole alkaloid. Most of the synthetic work has been devoted to preparing relatives of the monomeric alkaloids, such as reserpine and alstonine. The dimeric alkaloids, however, also are biologically and pharmacologically useful. It is an object of this invention to provide biologically and pharmacologically active dimeric alkaloids by synthetic means.

Summary

The compounds provided by this invention are represented by the following structural formula:

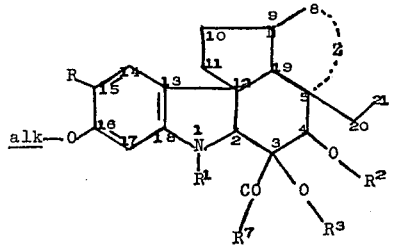

I wherein alk represents a lower alkyl group; $R^1$ is a member of the group consisting of hydrogen, alk, and CHO; $R^2$ and $R^3$ are members of the group consisting of hydrogen and —CO—alk; $R^7$ is a member of the group consisting of —NH—NH$_2$ and —O—alk; Z is a member of the group consisting of —CH$_2$—CH$_2$— and —CH=CH— and R is an α-methylene indole radical having the following structure:

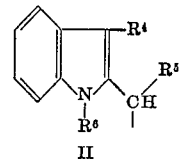

II wherein $R^4$, $R^5$ and $R^6$, when taken singly, are members of the class consisting of hydrogen and alk and $R^4$ and $R^5$, when taken together form an alkylene bridge containing 2–3 carbon atoms.

In the above formula, alk represents a lower alkyl group having from 1–3 carbon atoms, as for example methyl, ethyl, n-propyl or isopropyl. When $R^4$ and $R^5$, in Formula II, represent an unsubstituted alkylene bridge containing 2 or 3 carbon atoms, the resulting radicals are known as the 1-tetrahydrocarbazolyl radical or the 1,2,3,4-tetrahydrocyclopent[b] indolyl radical. The alkylene bridge represented by $R^4$ and $R^5$ when taken together can, however, be part of an extended ring system such as is common among some of the naturally occurring monomeric indole alkaloids. The scope of the terms $R^4$ and $R^5$ will be better exemplified later in the specification with reference to the starting materials employed in the formation of the dimeric indoles represented by Formula I above.

Compounds represented by Formula I are prepared by contacting vindoline or a vindoline derivative, represented by Formula I above when R is hydrogen, with an α-methylene indole represented by the following formula:

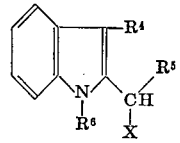

III wherein $R^4$, $R^5$ and $R^6$ have the same meaning as hereinabove, and X is a member of the group containing of OH, —O— alk and halo. When X represents halo, it can be fluoro, chloro, bromo, iodo or astatinyl. In general, X can be any group which will furnish a carbonium ion upon treatment with acid, and the hydroxy, alkoxy and halo groups specified for X above are simply common examples of this type of grouping.

The reaction which results in the formation of an indole dimer represented by Formula I is carried out under acidic conditions which preferably inivolve the use of an inert organic solvent such as methanol containing hydrogen chloride as the acidic catalyst. The acidic reaction conditions can also be involve the use of a nonpolar solvent such as benzene with aluminum chloride or zinc chloride as the acidic catalyst. In the above paragraph, the term "acid" has been used in its broadest sense to mean a Lewis acid, and the reaction conditions in general are those which have become widely known as Friedel-Crafts conditions. Because of the exceptional reactivity of the 15 position in the vindoline molecule, which position is ortho to an alkoxy group, the condensation to form the dimeric indole proceeds under far milder conditions than are usually necessary for the typical Friedel-Crafts reaction, and the reaction conditions tend to approximate those used in the Hoesch reaction and related condensations.

Among the α-methylene indoles, represented by Formula III above, which are useful in preparing the dimeric indoles of this invention, are included such diverse structures as α-chloromethyl indole, α-bromomethyl indole, α-hydroxymethyl indole, α-methoxy-methyl indole, β-ethyl-2-hydroxymethyl indole, and the like. When $R^4$ and $R^5$ form an alkylene bridge, the $a$-methylene indole can be 1-hydroxy-1,2,3,4-tetrahydrocarbazole, 1-chloro-1,2,3,4-tetrahydrocarbazole, 1-n-propoxy-1,2,3,4-tetrahydrocarbazole and the like. As previously stated, the alkylene bridge represented by $R^4$ and $R^5$ can also be part of an extended ring system such as is present in many naturally occurring indole alkaloids. Illustrative of such complex materials are perivinol, 18-OH-dihydrocleavamine, and 18-OH-ibogamine, whose structures are given below.

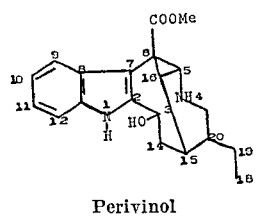
Perivinol

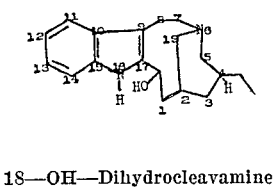
18—OH—Dihydrocleavamine

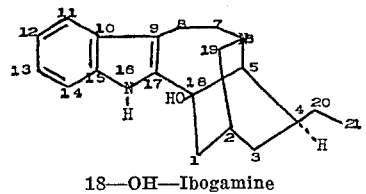
18—OH—Ibogamine

N-alkyl derivatives of the above naturally occurring alkaloids are also useful starting materials for the novel condensation provided by this invention.

Among the vindolines which are useful as the other starting materials in the novel condensation are included such compounds as 4-desacetylvindoline, 3,4-dipropionylvindoline, dihydrovindoline, 1-desmethylvindoline, 1-formyl-1-desmethyl-4-desacetylvindoline, 16-ethoxyvindoline, and 4-desacetylvindoline-3-hydrazide.

The products of our novel condensation reaction, the dimeric indoles, are isolated from the reaction mixtures in accordance with the standard procedures of the art. Because of the complex nature of certain of the starting materials, including vindoline and other naturally occurring alkaloids or their derivatives such as 18-OH-dihydrocleavamine and perivinol illustrated above, the separation of the dimeric indoles from the monomeric indoles from which they are derived can be an extremely complex procedure, and the use of chromatography or a gradient pH separation procedure may be necessary.

The compounds of this invention are able to inhibit the growth of viruses such as polio I, II and III virus, vaccinia virus and adeno III virus, particularly 1-(15-vindolinyl)-1,2,3,4-tetrahydrocarbazole hydrochloride, vobavindoline and isoperivindoline. These compounds do not show any cellular toxicity at doses at which they are able to inhibit the growth of the particular virus, and thus would be useful in preventing viral infections of cells grown in tissue culture or of bacteria grown for fermentation purposes. The compounds also have anti-inflammatory action and are adrenergic blocking agents.

This invention is further illustrated by the following specific examples:

EXAMPLE I

Preparation of 1-(15-vindolinyl)-1,2,3,4-tetrahydrocarbazole

A methanolic hydrogen chloride solution was prepared by adding 15 ml. of acetyl chloride slowly to 375 ml. of methanol. 16.84 g. of vindoline and 2.18 g. of 1-hydroxy-1,2,3,4-tetrahydrocarbazole were added to the acidic solution. The resulting solution was heated to refluxing temperature for about 1 hour while being stirred, and the solvent was then removed by evaporation in vacuo. The residue containing 1-(15-vindolinyl)-1,2,3,4-tetrahydrocarbazole was taken up in a mixture of ether and saturated aqueous sodium bicarbonate. The ether layer was separated and dried. Gaseous anhydrous hydrogen chloride was passed into the ether solution, thus forming 1-(15-vindolinyl)-1,2,3,4-tetrahydrocarbazole hydrochloride, which precipitated in the form of white crystals. The crystals were collected and were recrystallized from a mixture of methanol and ether. 1-(15-vindolinyl)-1,2,3,4-tetrahydrocarbazole hydrochloride thus prepared melted at about 204–207° C.

Analysis.—Calc.: C, 65.32; H, 6.82; N, 6.18. Found: C, 65.08; H, 7.13; N, 6.09.

The structure of the reaction product, 1-(15-vindolinyl)-1,2,3,4-tetrahydrocarbazole, was further verified by means of infrared and nuclear magnetic resonance spectroscopy.

EXAMPLE II

Preparation of cleavodesacetylvindoline hydrazide

Four grams of dihydrocleavamine were dissolved in 192 ml. of methylene dichloride. 1.47 g. of triethylamine were added to this solution which was then cooled to about 0° C. 1.7 g. of freshly prepared t-butyl hypochlorite solution were added with stirring. After the addition had been completed, the resulting solution was stirred at about 0° C. for an additional 40 minutes. The organic layer was then washed once with a mixture of ice and water, separated and dried. The solvent was removed by absorption in vacuo, leaving as a residue 9-chlorotetrahydrocleavamine.

1.12 g. of 9-chlorotetrahydrocleavamine and 1 g. of desacetylvindoline hydrazide were placed in a 200 ml. flask. 100 ml. of methanolic hydrogen chloride solution, prepared by adding 4 ml. of acetyl chloride to 100 ml. of anhydrous methanol, was added to the flask. The resulting solution was heated to reflux for about 3 hours. The reaction mixture was then cooled and a saturated solution of aqueous sodium carbonate added. Sufficient 15 ammonium hydroxide was added to make the aqueous layer basic. The methylene dichloride layer was separated and dried and the solvent removed by evaporation in vacuo. The resulting residue was subjected to thin layer chromatography on silica using anhydrous methanol as a solvent. The thin layer chromatogram demonstrated the presence of a dimeric indole alkaloid.

The above residue was therefore subjected to a gradient pH separation procedure according to the method of Svoboda, Lloydia, 24, 173 (1961). In carrying out this procedure, the above residue was dissolved in 25 ml. of a 1:1 chloroform-benzene solvent mixture and the resulting solution was shaken with 25 ml. of a 0.1 M citric acid solution. The organic layer was separated and the solvent removed by evaporation in vacuo. The resulting residue was subjected to a thin layer chromatography procedure in order to ascertain the complexity of the mixture of the materials left in the residue. The pH of the citric acid solution was then increased in increments of one-half pH units by the addition of 7 N aqueous ammonium hydroxide. At each new pH level, the aqueous layer was extracted with 25 ml. of a 1:1 chloroform-benzene solvent and the residue obtained therefrom subjected to a thin layer chromatography procedure. The chloroform-benzene extract obtained at pH=6.0 proved to have only two alkaloidal materials present. Crystallization of this residue yielded one-spot material, melting at about 189–193° C. This new dimeric indole was named cleavodesacetylvindoline hydrazide. Its structure was verified by infrared and nuclear magnetic resonance spectroscopy.

EXAMPLE III

Preparation of perivindoline

Following the procedure of Example I, 1 g. of perivinol and 1.2 g. of vindoline were heated to refluxing temperature in methanolic hydrogen chloride for about 2 hours. Perivindoline thus formed was isolated by the procedure of Example I. The crude product was purified by a gradient pH procedure as set forth in Example II, using benzene as the extracting solvent. Extracts at pH=6.5 were found to contain perivindoline. Perivindoline free base was amorphous, but was shown to have the expected structure by infrared and nuclear magnetic resonance spectroscopy.

Perivindoline free base was dissolved in aqueous methanol and the pH of the resulting solution was adjusted to about 3 by the addition of 1 percent sulfuric acid. Evaporation of the resulting mixture in vacuo yielded perivindoline sulfate as a residue. Perivindoline sulfate was crystallized from methanol and melted above 340° C.

EXAMPLE IV

Preparation of 16-epiperivindoline

Following the procedure of Example I, 16-epiperivinol and vindoline were reacted in methanolic hydrogen chloride solution to yield 16-epiperivindoline which was isolated by the procedure of Example I and purified by a gradient pH separation procedure as set forth in Example III. A benzene extract at pH=4.5 yielded 16-epiperivindoline as a residue upon evaporation to dryness. 16-epiperivindoline thus prepared melted at about 224–228° C. after crystallization from an ether-methylene dichloride solvent mixture.

16-epiperivindoline sulfate was prepared by the procedure of Example III and melted above 325° C.

EXAMPLE V

Preparation of vobavindoline

Following the procedure of Example I, vobasinol and vindoline were reacted in methanolic hydrogen chloride to yield vobavindoline, which was isolated by the procedure of Example I and purified by chromatography over alumina, employing methylene chloride as the eluting solvent. Vobavindoline was obtained in eluant fractions obatined after the elution of unreacted vobasinol. Thin-layer chromatography of the residue obtained after evaporating methylene dichloride from the extract demonstrated that only a single substance was present and that it had a different $R_f$ value from either of the starting materials.

EXAMPLE VI

Preparation of 4-allylperivindoline

Following the procedure of Example I, 4-allylperivinol and vindoline were reacted in methanolic hydrogen chloride to yield 4-allylperivindoline, which was isolated by the procedure of Example I and purified by a gradient pH separation procedure according to the method of Example II. 4-allylperivindoline was obtained from benzene extracts at pH=3.5, 4.0, and 4.5. Evaporation of the solvent yielded 4-allylperivindoline in amorphous form. 4-allylperivindoline free base was converted to the sulfate salt by the procedure of Example III. 4-allylperivindoline sulfate melted above 320° C. after crystallization from acetone.

We claim:
1. A compound of the formula:

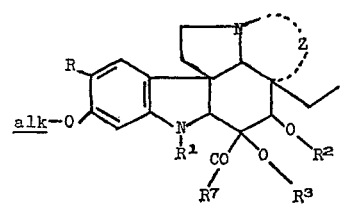

wherein alk represents a lower alkyl group; $R^1$ is a member of the group consisting of hydrogen, alk, and CHO; $R^2$ and $R^3$ are members of the group consisting of hydrogen and —CO—alk; $R^7$ is a member of the group consisting of —NH—NH$_2$ and —O—alk; Z is a member of the group consisting of —CH$_2$—CH$_2$— and

and R is an α-methylene indole radical of the structure:

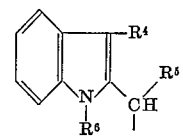

wherein $R^4$, $R^5$ and $R^6$, when taken singly, are members of the class consisting of hydrogen and alk and $R^4$ and $R^5$, when taken together, form an alkylene bridge containing 2–3 carbon atoms.

2. A compound of claim 1, wherein said compound is 1-(15-vinyldolinyl)1,2,3,4-tetrahydrocarbazole.

3. A compound of claim 1, wherein said compound is 15 - (18 - dihydrocleavaminyl)-3-desacetylvindoline-3-hydrazine.

4. The process which comprises reacting in an inert solvent under acidic conditions an indole of the formula:

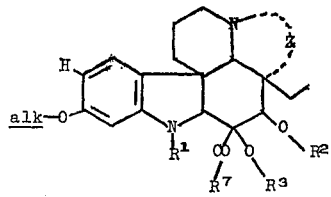

wherein alk represents a lower alkyl group; $R^1$ is a member of the group consisting of hydrogen, alk, and CHO; $R^2$ and $R^3$ are members of the group consisting of hydrogen and —CO—alk; $R^7$ is a member of the group consisting of —N—NH$_2$ and —O—alk; and Z is a member of the group consisting of —CH$_2$—CH$_2$— and

—CH=CH— with an α-methylene indole represented by the formula:

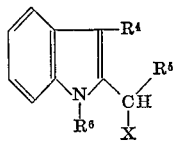

wherein $R^4$, $R^5$ and $R^6$ have the same meaning as hereinabove stated and X is a member of the group consisting of OH, —O—alk and halo.

References Cited

UNITED STATES PATENTS 3,015,661  1/1962  Georgian _____ 260—287

OTHER REFERENCES

De Long et al. Ann. of N.Y. Acad. Sci., vol. 130, pp. 440–48 (1965).

ALTON D. ROLLINS, *Primary Examiner.*

D. G. DAUS, *Assistant Examiner.*

U.S. Cl. X.R.

260—288, 236, 296, 326.15, 294.3, 315, 326.16, 326.14; 167—65